United States Patent [19]

Egolf

[11] 4,363,241

[45] Dec. 14, 1982

[54] ROTATIONAL SPEED GOVERNOR

[75] Inventor: Thomas A. Egolf, East Hartford, Conn.

[73] Assignee: United Technologies Corporation, Hartford, Conn.

[21] Appl. No.: 219,755

[22] Filed: Dec. 23, 1980

[51] Int. Cl.³ ............................................. G05D 13/14
[52] U.S. Cl. ....................................... 73/536; 416/44; 416/51
[58] Field of Search .......................... 73/535, 536–538; 416/44, 51

[56] References Cited

U.S. PATENT DOCUMENTS 2,762,384 9/1956 Rosenberger .......................... 73/537
3,421,414 1/1969 Peale ...................................... 73/538

FOREIGN PATENT DOCUMENTS 12038 12/1880 Fed. Rep. of Germany ........ 73/535

Primary Examiner—James J. Gill
Attorney, Agent, or Firm—John Swiatocha

[57] ABSTRACT

An improved rotational speed governor characterized by a non-linear response to speed changes, includes a control arm, the angular position of which changes in response to the rotational speed of the governor, the control arm carrying a weight held to a fixed position with respect to the control arm at speeds less than a first predetermined speed and displaced from said control arm by centrifugal force at speeds greater than that predetermined speed to effect a non-linear pivotal displacement response to the control arm.

11 Claims, 10 Drawing Figures

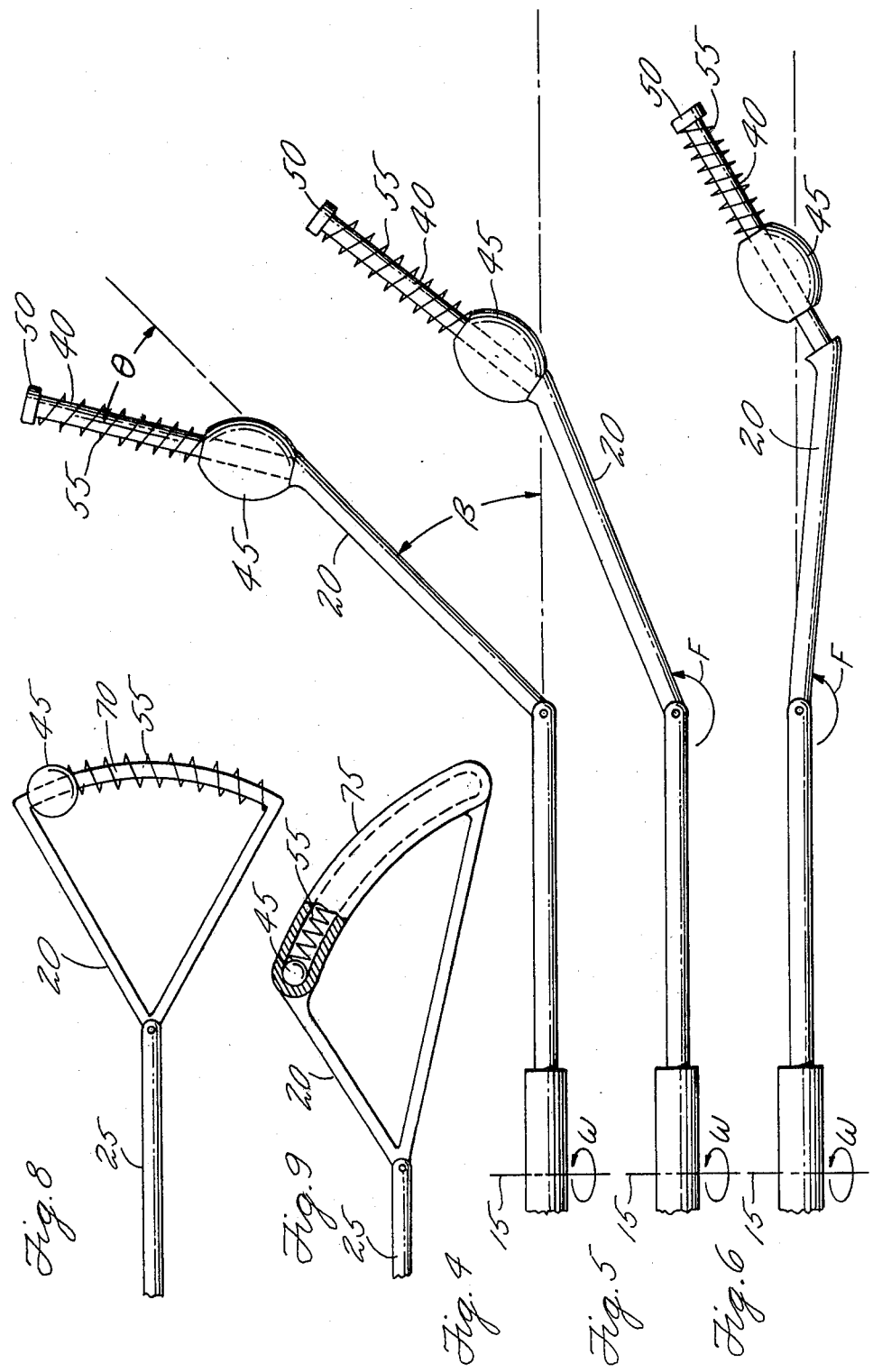

ROTATIONAL SPEED GOVERNOR

DESCRIPTION

1. Technical Field

This invention relates to a governor for controlling the rotational speed of a body such as a wind turbine rotor.

2. Background Art

There have been many prior art applications of governors which provide some sort of actuation of a body in response to the rotational speed of the governor. One example of such rotational speed governor control is found in U.S. Pat. No. 4,083,651 to Cheney, Jr. et al wherein a rotational speed governor is employed in a wind turbine to adjust turbine blade pitch in response to the rotational speed of the wind turbine. This blade pitch adjustment is effected by a pivoting of a plurality of governor pendulum members connected to the turbine blades, this pivoting being in respnse to centrifugal loading of the pendulum members due to the rotation thereof by the rotation of the turbine hub. The pivotal movement of the pendulum members and therefore, the resulting pitch adjustment of the blades varies with changes in rotational speed of the rotor.

It has been found that certain types of non-linear responses not exhibited by the governor described above would, in certain circumstances, be desirable. For example, when the governor is employed to effect wind turbine blade pitch adjustment, a governor which provides actuation in a first direction to increase blade pitch as wind velocity increases, and then reverses direction under conditions of further increase in wind velocity to feather the blades and thus, prevent overspeed operation would greatly enhance control of the turbine performance. No known prior art governor is capable of effecting such a non-linear response or reversal of actuation direction under conditions of increasing rotational speed.

DISCLOSURE OF INVENTION

Objects of the present invention include provision of an improved rotational speed governor capable of various non-linear responses to rotational speed changes.

In accordance with the present invention, a governor providing actuation of a body in response to the rotational speed of the governor includes a pivotal control arm connected to the body to be actuated; a weight carried by the control arm and fixed with respect thereto at rotational speeds less than a predetermined speed; and means for allowing displacement of the weight with respect to the control arm under centrifugal loading of the weight at speeds greater than the predetermined speed, thereby adjusting the relative orientation of the weight with the control arm for selectively varying the pivotal actuation of the body by the control arm. In the preferred embodiment, the weight is mounted on a track extending from the control arm and is held fixed with respect to the control arm by a preloaded spring. As the rotational speed of the governor increases, the component of centrifugal force acting on the weight in a direction parallel to the spring force compresses the spring, thereby allowing limited movement of the weight along the track. The weight movement adjusts the relative orientation of the weight and control arm to effect the variation in the control arm response to the increased speed of the governor. In one embodiment, the track is disposed relative to the control arm such that the path of the weight is in a direction toward the plane of rotation of the actuated body from the end of the control arm whereupon at rotational speeds greater than the predetermined speed, the directional response of the control arm is reversed from that at speeds less than the predetermined speed. In another embodiment of the present invention, the track is disposed relative to the control such that the path of the weight from the end of the control arm is away from the plane of rotation of the actuated body, whereupon at speeds greater than the predetermined speed, the displacement response of the control arm is accelerated.

The foregoing, and other features and advantages of the present invention, will become more apparent from the following description and accompanying drawing.

BRIEF DESCRIPTION OF THE DRAWINGS

FIG. 4 is a side elevation of an alternate embodiment of the rotational speed governor of the present invention at rest.

FIG. 5 is a view similar to FIG. 4, illustrating the response of the governor to the rotation thereof.

FIG. 6 is a view similar to FIG. 5 illustrating the response of the governor to a rotational speed greater than that at which the governor was illustrated in FIG. 5.

FIG. 8 is a side elevation of an alternate embodiment of the rotational speed governor of the present invention.

FIG. 9 is a side elevation of another alternate embodiment of the rotational speed governor of the present invention.

BEST MODE FOR CARRYING OUT THE INVENTION

Figure 1:
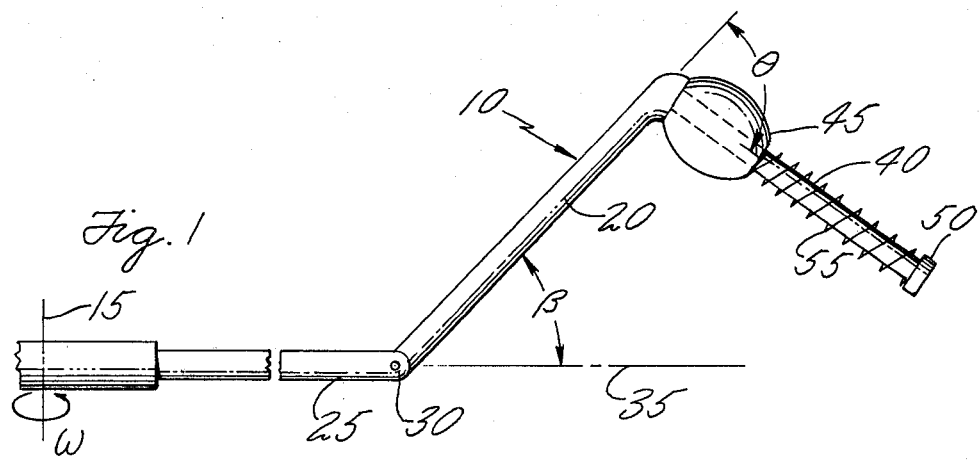
FIG. 1 is a side elevation of the rotational speed governor of the present invention at rest.
Figure 2:
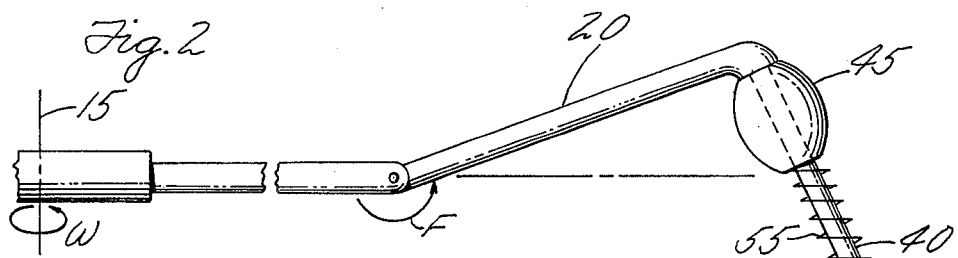
FIG. 2 is a view similar to FIG. 1 and illustrates the response of the governor to rotation thereof.
Figure 3:
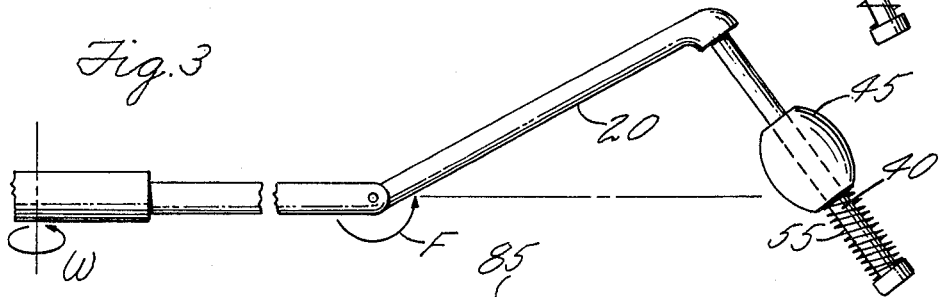
FIG. 3 is a view similar to FIG. 2 illustrating the response of the governor to rotational speeds greater than that at which the governor is illustrated in FIG. 2.

Referring to FIGS. 1-3, the rotational speed governor of the present invention is shown generally at 10. The governor rotates in the direction indicated by arrow ω (FIGS. 2 and 5) about axis 15. The governor comprises a control arm 20 pivotally mounted on arm 25 at pivot connection 30, the control arm being pivotable toward and away from plane of rotation 35 (normal to the plane of the drawing) of the governor. Fixed to the end of control arm 20 and extending therefrom in a direction toward the plane of rotation is a track (guide) 40 received through a bore in weight 45 which is slideable on the track. The guide includes at the end thereof, a spring retainer 50, and is received through the center of a coil spring 55 or equivalent resilient means preloaded or compressed between retainer 50 and the weight 45 urging the weight against the end of control arm 20.

Governor 10 may be employed to actuate any desired body or mechanism. By way of example, the governor may be connected to a spar or flexible beam, (not shown) of a wind turbine blade such that pivoting of control arm 20 causes a pivoting of the flexible beam about its own longitudinal axis, thereby adjusting the blade pitch. In FIG. 1, the governor is shown at rest, control arm 20 defining with plane of rotation 35, angle $\beta$ equal in this particular embodiment to 45°. The control arm and track 40 define an angle $\theta$ equal in this embodiment, to 80°. However, it will be understood that the invention herein is not limited to these particular angular orientations, such orientations being determined by the desired implementation of the governor.

As shown in FIG. 2, as the governor rotates about axis 15 with the actuated member or body, the centrifugal force which weight 45 exerts on control arm 20 increases. This force includes a component normal to the longitudinal axis of control arm 20, this component pivoting control arm 20 toward plane of rotation 35, thereby pivotally actuating the actuated body. Assuming that this body is a flexible wind turbine beam or spar, actuation of the spar (twisting of the spar about its longitudinal axis) results in a restoring force indicated by arrow F being applied to the control arm, this restoring force being in an opposite direction to, and balanced by, the component of centrifugal force which pivots arm 20 toward plane 35 and is proportional to the degree of displacement of arm 20.

It will be noted that the centrifugal force acting on weight 45 also includes a component parallel to the force exerted on the weight by preloaded spring 55. Until this component overcomes the loading of the spring, the spring maintains the weight fixed with respect to the control arm. As the speed of rotation increases, the centrifugal force of the weight increases by virtue of the increased speed and the increased displacement of the weight from axis 15 as the weight and control arm pivot toward plane 35. Accordingly, as the speed of rotation increases, the magnitude of displacement of the actuated body increases as does the restoring force F applied to the control arm by the actuated body. However, as best seen in FIG. 3, when the component of centrifugal force parallel to the spring force overcomes that spring force, the weight is urged by centrifugal force along track 40, thereby further compressing spring 55. Compression of spring 55 relieves a portion of that component of centrifugal force which pivots control arm 20 toward plane of rotation 35. Moreover, since the control arm has already pivoted toward plane 35, reducing angle $\beta$, a lesser fraction of the centrifugal force is available to continue pivoting arm 20 than was available at greater angular displacements of arm 20 from the plane. Accordingly, restoring force F from the actuated spar or beam overcomes the component of centrifugal force which pivots arm 20 toward plane 35, and arm 20 reverses direction increasing angle $\beta$, and thereby reversing the direction of actuation of the beam. Thus, it is seen that the speed governor of the present invention is particularly well suited for wind turbines such as that disclosed in the hereinbefore cited Cheney, Jr. et al patent in that as the speed of the wind acting on the turbine increases from low velocities, the governor is able to adjust the blade pitch to continuously take advantage of increasing wind velocity for increasing energy capture. However, should wind velocity force the wind turbine to exceed a maximum predetermined rotational velocity, the control arm reverses direction, adjusting blade pitch toward a feathered condition to reduce the amount of wind energy capture, and thus retard the rotational speed.

Figure 7:
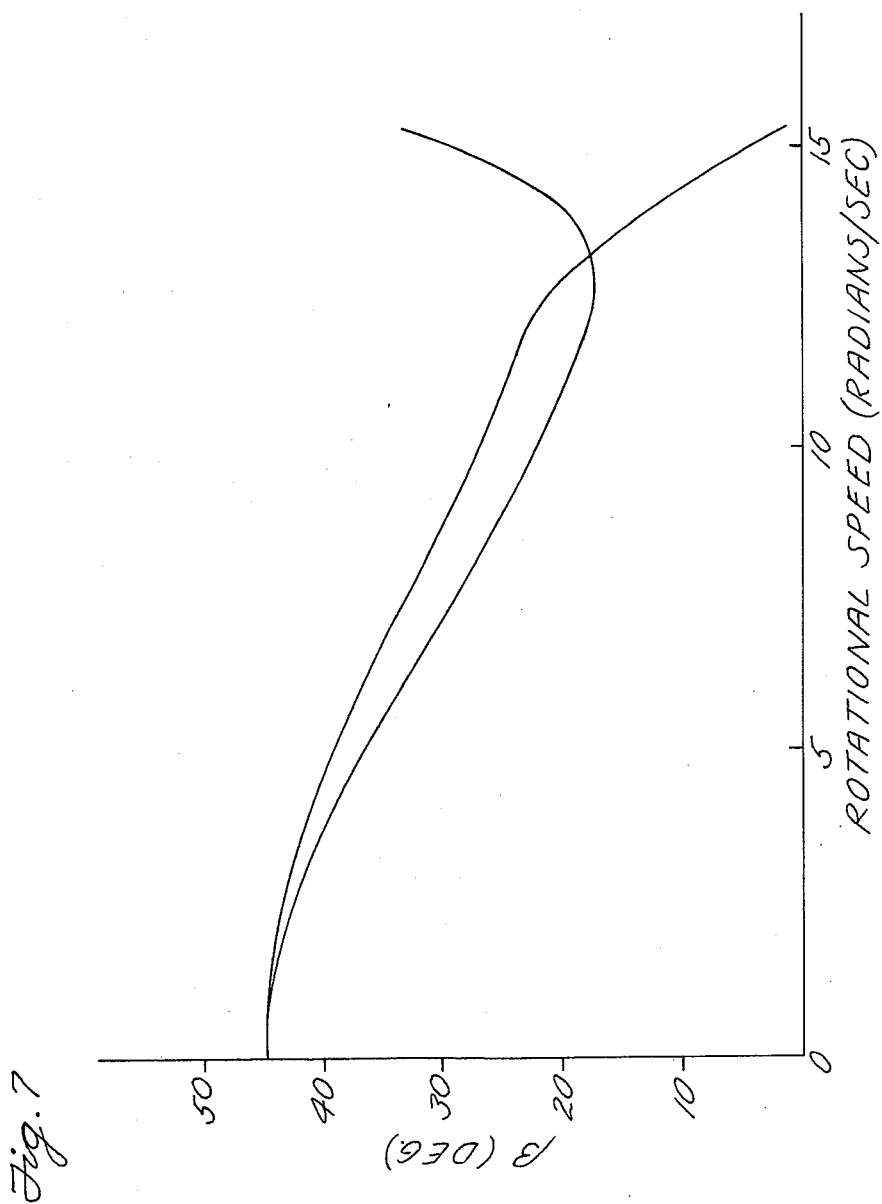
FIG. 7 is a graphical representation of the response of the governors of FIGS. 1-3 and 4-6 to varying rotational speeds thereof.

Referring to FIG. 7, the performance of the governor illustrated in FIGS. 1-3 is graphically indicated by curve 60. For purposes of illustrated, for curve 60, the mass of the governor weight is 1.0 slug, $\theta$ is 80°, and the constant of spring 55 is 500 lb$_f$/ft ($2.4 \times 10^4$ NT/M$^2$). At rest, angle $\beta$ between control arm 20 and plane of rotation 35 is approximately 45°. As the rotational speed of the governor increases from rest, $\beta$ decreases as the control arm approaches the plane of rotation. However, at a predetermined speed of approximately 12.5 radians per second, spring 55 compresses, and restoring force F is no longer balanced by that component of centrifugal force normal to the control arm. Restoring force F thereafter urges control arm 20 away from plane 35 despite continued increase in the rotational speed of the governor.

Referring to FIGS. 4-6, an alternate embodiment of the governor of the present invention is shown. This governor is of substantially the same construction as the governor of FIGS. 1-3 with the exception that track or guide 40 extends from the end of control arm 20 away from plane of rotation 35, the track and the longitudinal axis of the control arm defining an angle $\theta$ of 30°.

Referring to FIGS. 4, 5, and 6 and curve 65 (FIG. 7) wherein the mass of the weight and the spring constant are the same as those set forth with respect to curve 60, and which graphically illustrates the performance of the speed governor of FIGS. 4-6, at rest, angle $\beta$ between the control arm and the plane of rotation is 45°. As the speed of rotation of the governor is increased from rest, the centrifugal force acting on weight 45 increases due to the increase in rotational speed and the increase in displacement of the weight from axis of rotation 15. This increase in centrifugal force results in an increase in the component of that force normal to control arm 20, thereby pivoting control arm 20 toward plane of rotation 35, reducing angle $\beta$. As the speed of rotation increases further, that component of centrifugal force parallel to the force of preloaded spring 55 overcomes the loading of that spring, whereby the spring is further compressed accommodating outward movement of weight 45 along the track. This outward displacement of the weight relative to axis of rotation 15, enhances centrifugal force of the weight. This further increase in centrifugal force causes further compression of the spring, further outward displacement of the weight and yet a further increase in centrifugal loading resulting in an angular acceleration of the control arm toward the plane of rotation as illustrated by that portion of curve 65 between approximately 12.5 radians per second and the curve end.

While the invention for purposes of illustration has been shown in particular structural embodiments thereof, it will be appreciated that alternate embodiments may be brought to mind by the hereinabove detailed description. For example, while certain angular orientations of the guide with respect to the control arm have been shown, it will be understood that the invention contemplates any angular orientation of these members such as a colinear mutual orientation, the orientation being determined by the required response of the governor. Referring to FIG. 8, a speed governor similar to that of FIGS. 1-3 is shown. However, in FIG. 8, the track 70 on which weight 45 rides is of curvilinear rather than straight configuration. It has been determined that this configuration of track 70 slows the rate at which control arm 20 reverses direction upon compression of spring 70 by the weight. In FIG. 9, a similar speed governor is shown, this governor employing a weight and spring disposed internally of a curvilinear track 75, for example, for reducing aerodynamic drag of the governor. Moreover, while a coil spring has been shown as a means for preventing movement of the weight until the predetermined rotational speed has been reached, various other equivalent elastic or resilient members may be employed as may various other relative orientations between the control arm and track.

Figure 10:
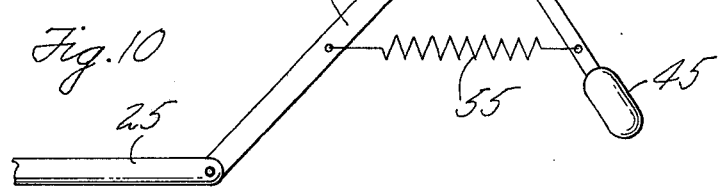
FIG. 10 is a side elevation of another alternate embodiment of the rotational speed governor of the present invention.

Additionally, the present invention is not limited to a sliding weight displacement along a track or guide. As shown in FIG. 10, the weight may be fixed to a mount 80 therefor, the mount being pivotally mounted at 85 to arm 20 and further connected to control arm 20 by spring 90 which functions as spring 55 to maintain the weight fixed with respect to the control arm at rotational speeds less than the predetermined speed, while allowing pivotal displacement of the weight with respect to the control arm at rotational speeds greater than the predetermined speed.

Accordingly, in view of the above, it will be understood by those skilled in the art that various modifications in form and detail may be made without departing from the invention, and it is intended by the appended claims to cover such modifications as come within the true spirit and scope of the invention.

I claim:

1. A governor providing actuation of a body in response to the rotational speed of said governor, said governor being characterized by:
    a control arm connected to said body and pivotable about an axis therethrough, said body applying a restoring force to said control arm,
    a weight, carried by said control arm and under conditions of centrifugal loading thereof, due to rotation of said governor, being urged outwardly along a path extending from an outer end of said control arm toward the plane of rotation of said body thereby pivotally biasing said control arm in a direction opposite that of said restoring force, and
    means carried by said control arm for restraining said weight in a fixed position with respect to said control arm at rotational speeds less than a first predetermined speed and accommodating centrifugal loading of said weight at rotational speeds greater than said first predetermined speed by displacement of said weight relative to said control arm, said centrifugal loading of said weight at speeds less than said predetermined speed overcoming said restoring force to effect pivoting of said control arm in one direction, said centrifugal loading at selected speeds greater than said predetermined speed being overcome by said restoring force thereby causing pivoting of said control arm in a direction opposite said one direction.

2. The governor of claim 1 characterized by said restraining means comprising a resilient means.

3. The governor of claim 1 characterized by said resilient means being preloaded.

4. The governor of claim 1 characterized by a track carried by said control arm, said weight being movable along said track, said restraining means comprising a preloaded spring extending between a portion of said track and said control arm and bearing against said weight.

5. The governor of claim 4 characterized by said track being curvilinear.

6. The governor of claim 4 characterized by said displacement of said weight being angularly offset with respect to said control arm.

7. The governor of claim 6 characterized by displacement of said weight being confined to a path extending from an outer end of said control arm away from the plane of rotation of said body.

8. The governor of claim 7 characterized by said body continuously applying a restoring force to said control arm urging said control arm in a direction opposite that of said biasing of said control arm by said weight under conditions of the centrifugal loading thereof, said centrifugal loading of said weight continuously overcoming said restoring force at selected speeds greater than said predetermined speed to effect a positive angular acceleration of said control arm.

9. A governor providing actuation of a body in response to the rotational speed of said governor, said governor being characterized by:
    a control arm connected to said body and pivotable about an axis therethrough,
    a weight carried by said control arm by pivotal mounting thereon, said weight being urged outwardly under the influence of centrifugal force acting thereon under conditions of rotation of said governor thereby pivotally biasing said control arm, and
    a preloaded resilient means carried by said control arm and connected to said control arm and said weight for restraining said weight in a fixed position with respect to said control arm at rotational speeds less than a first predetermined speed and accommodating centrifugal loading of said weight at rotational speeds greater than said first predetermined speed by displacement of said weight relative to said control arm.

10. The governor of claim 9 characterized by the displacement of said weight being confined to a path extending from an outer end of said control arm toward the plane of rotation of said body.

11. The governor of claim 10 characterized by said body continuously applying a restoring force to said control arm in a direction opposite that of said biasing of said control arm by said weight under conditions of the centrifugal loading thereof, said centrifugal loading of said weight at speeds less than said predetermined speed, overcoming said restoring force to effect pivoting of said control arm in one direction, said centrifugal loading at selected speeds greater than said predetermined speed being overcome by said restoring force thereby causing pivoting of said control arm in a direction opposite said one direction.

* * * * *